United States Patent
Azizi et al.

(10) Patent No.: US 10,278,044 B2
(45) Date of Patent: Apr. 30, 2019

(54) SYSTEMS AND METHODS FOR TRANSMITTING AND MANAGING COMMUNICATION ON DEDICATED SHORT-RANGE COMMUNICATION CHANNELS

(71) Applicants: Shahrnaz Azizi, Cupertino, CA (US); Eldad Perahia, Portland, OR (US); Thomas Kenney, Portland, OR (US)

(72) Inventors: Shahrnaz Azizi, Cupertino, CA (US); Eldad Perahia, Portland, OR (US); Thomas Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 169 days.

(21) Appl. No.: 14/455,277

(22) Filed: Aug. 8, 2014

(65) Prior Publication Data
US 2016/0044443 A1 Feb. 11, 2016

(51) Int. Cl.
*H04W 4/00* (2018.01)
*H04W 4/02* (2018.01)
*H04W 4/80* (2018.01)
*H04W 84/20* (2009.01)

(52) U.S. Cl.
CPC .............. *H04W 4/80* (2018.02); *H04W 84/20* (2013.01)

(58) Field of Classification Search
CPC ... H04W 4/008; H04W 76/021; H04W 64/00; H04W 76/02; G01B 11/2755; G01B 2210/16; G01B 2210/58; G01B 2210/10; H04N 5/23206
See application file for complete search history.

(56) References Cited

U.S. PATENT DOCUMENTS

| | | | | |
|---|---|---|---|---|
| 8,280,595 B2* | 10/2012 | Foster | .................. | A01B 79/005 340/539.13 |
| 8,626,144 B2* | 1/2014 | Talty | .................... | H04W 4/008 455/41.2 |
| 2007/0115942 A1* | 5/2007 | Money | ................ | H04L 12/6418 370/352 |
| 2008/0318612 A1* | 12/2008 | Axnas | ................ | H04W 76/023 455/522 |
| 2009/0024272 A1* | 1/2009 | Rogers | ............... | G01B 11/2755 701/31.4 |
| 2010/0182195 A1* | 7/2010 | Garin | .................... | G01S 5/0284 342/357.22 |
| 2011/0098001 A1* | 4/2011 | Elsom-cook | .............. | G01S 3/20 455/41.2 |

(Continued)

*Primary Examiner* — Dong-Chang Shiue
(74) *Attorney, Agent, or Firm* — Eversheds Sutherland (US) LLP (57) ABSTRACT

The present disclosure relates to computer-implemented systems and methods for transmitting and receiving audio and video data. A method may include receiving, by a device including one or more processors and a radio transceiver, an indication that the device is a master device. The method may also include determining that the master device is located outside of a vehicle. Furthermore, the method may include identifying, based on determining that the master device is located outside of the vehicle, a client device. Additionally, the method may include transmitting a signal, to the client device, to indicate a peer-to-peer connection in a communication channel is enabled.

23 Claims, 5 Drawing Sheets

(56) References Cited

U.S. PATENT DOCUMENTS

| | | | |
|---|---|---|---|
| 2011/0136509 A1* | 6/2011 | Osann, Jr. | H04W 4/02 |
| | | | 455/456.3 |
| 2012/0256597 A1* | 10/2012 | Miyamoto | H02M 7/06 |
| | | | 320/137 |
| 2013/0130684 A1* | 5/2013 | Gomes | H04W 8/186 |
| | | | 455/435.1 |
| 2013/0337830 A1* | 12/2013 | Haro | H04W 4/02 |
| | | | 455/456.1 |
| 2014/0045556 A1* | 2/2014 | Subramanian | H04W 52/0251 |
| | | | 455/574 |
| 2015/0208455 A1* | 7/2015 | Yen | H04W 76/023 |
| | | | 370/329 |

\* cited by examiner

SYSTEMS AND METHODS FOR TRANSMITTING AND MANAGING COMMUNICATION ON DEDICATED SHORT-RANGE COMMUNICATION CHANNELS

TECHNICAL FIELD

The present disclosure generally relates to wireless communication, and in particular, to managing communication on dedicated short-range communication channels.

BACKGROUND

Recently, the Federal Communications Commission has proposed allowing consumer devices to access short-range communication channels, which may be typically used by vehicle communication systems. For example, vehicle systems may use dedicated short-range communication (DSRC) systems for a wide variety of functions, such as collision avoidance, emergency response, and/or other safety related features. As such, consumer devices that desire to establish communications in short-range communication channels may be configured to avoid interfering with vehicle communication systems operating in such channels.

BRIEF DESCRIPTION OF THE DRAWINGS

Reference will now be made to the accompanying figures and diagrams, which are not necessarily drawn to scale, and wherein.

DETAILED DESCRIPTION

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "mobile device" and/or "device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "receiver" may refer to any device or component capable of receiving data, signals, information, etc. For example, a receiver may include an antenna or any other master device.

As used herein, unless otherwise specified, the term "transmitter" may refer to any device or component capable of transmitting data, signals, information, etc. For example, a transmitter may also include an antenna or any other transmission device.

As used herein, unless otherwise specified, the term "transceiver" may refer to any device or component capable of performing the functions of a receiver and/or a transmitter. For example, transceivers may include, but are not limited, antennas, amplifiers, filters, modulation and/or demodulation components, analog-to-digital converters, digital-to-analog converters, and/or the like.

According to certain embodiments, the functionality provided by the receiver and the transmitter may be included in a single transceiver device.

The present disclosure relates to computer-implemented systems and methods for transmitting and receiving audio and video data. According to one or more embodiments of the disclosure, a device is provided. The device may include a radio transceiver and at least one memory for storing data and computer-executable instructions. Additionally, the device may also include at least one processor to access the at least one memory and to execute the computer-executable instructions. Furthermore, the at least one processor may be configured to execute the instructions to receive an indication that the device is a short-range communication master device. Additionally, the at least one processor may be configured to execute the instructions to determine that the short-range communication master device is located outside of a vehicle. The at least one processor may also be configured to execute the instructions to identify, based on determining that the short-range communication master device is located outside of the vehicle, a short-range communication client device. The at least one processor may also be configured to execute the instructions to transmit, by the radio transceiver to the short-range communication client device, an indication that peer-to-peer connection in a short-range communication channel is enabled.

According to one or more embodiments of the disclosure, a method is provided. The method may include receiving, by a device including one or more processors and a radio transceiver, an indication that the device is a short-range communication master device. The method may also include determining that the short-range communication master device is located outside of a vehicle. Additionally, the method may include identifying, based on determining that the short-range communication master device is located outside of the vehicle, a short-range communication client device. The method may also include transmitting, to the short-range communication client device, an indication that peer-to-peer connection in a short-range communication channel is enabled.

According to one or more embodiments of the disclosure, a non-transitory computer-readable medium is provided. The non-transitory computer-readable medium may have embodied thereon instructions executable by one or more processors. The instructions may cause the one or more processors to receive an indication that the device is a short-range communication master device. Additionally, the computer-readable medium may include instructions to determine that the short-range communication master device is located outside of a vehicle. Moreover, the computer-readable medium may include instructions to identify, based on determining that the short-range communication master device is located outside of the vehicle, a short-range communication client device. The computer-readable medium may also include instructions to transmit, to the short-range communication client device, an indication that peer-to-peer connection in a short-range communication channel is enabled.

Figure 1:
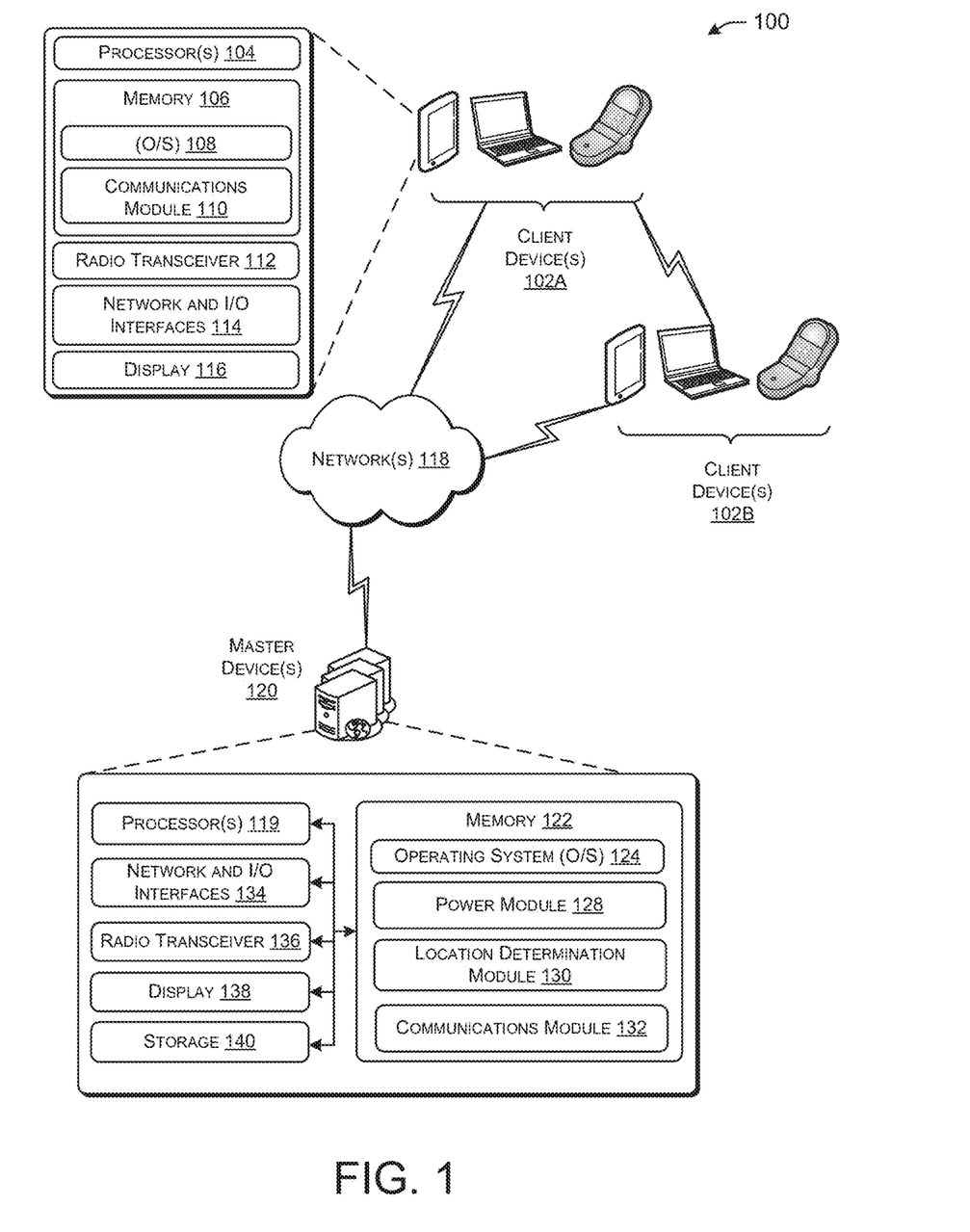
FIG. 1 shows a block diagram of a system for managing short-range communication, according to one or more example embodiments.

The above principles, as well as perhaps others, are now illustrated with reference to FIG. 1, which depicts a system 100 for managing short-range communication. The system 100 may include a client device 102A having one or more computer processors 104 and a memory 106, which may store an operating system 108. The client device 102A may further include a communications module 110, a radio transceiver 112, network and input/output (I/O) interfaces 114, and a display 116 in communication with each other. The system 100 may also include a network 118 to facilitate communication between the client device 102A, another client device 102B, and/or one or more master device(s) 120. Client device 102B may include similar components to client device 102A. Furthermore, in some implementations, client device 102A and client device 102B may wish to establish a peer-to-peer connection with each other.

The master device 120 may include one or more computer processors 119, and a memory 122, which may include an operating system 124. The master device 120 may further include a power module 128, a location determination module 132, a communications module 130, network and input/output (I/O) interfaces 134, a radio transceiver 136, a display 138, and a storage 140 in communication with each other. It will be appreciated that all radio transceivers 112/136 described with respect to the client device 102A and master device(s) 120 may be configured to receive and/or transmit any type of radio signals (e.g., Dedicated short-range communication (DSRC) signals, WiFi radio signals, Bluetooth radio signals, Bluetooth Low-Energy radio signals, etc.).

The computer processors 104/119 may comprise one or more cores and may be configured to access and execute (at least in part) computer-readable instructions stored in the memory 106/122. The one or more computer processors 104/119 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The client devices 102 may also include a chipset (not shown) for controlling communications between the one or more processors 104/119 and one or more of the other components of the client device 102. In certain embodiments, the client device 102A may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106/122 may comprise one or more computer-readable storage media (CRSM). In some embodiments, the memory 106/122 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106/122 may store an operating system that includes a plurality of computer-executable instructions that may be implemented by the computer processor 104/119 to perform a variety of tasks to operate the interface(s) and any other hardware installed on the client device 102. The memory 106/122 may also store content that may be displayed by the client device 102A or transferred to other devices (e.g., headphones) to be displayed or played by the other devices. The memory 106/122 may also store content received from the other devices. The content from the other devices may be displayed, played, or used by the client device 102A to perform any necessary tasks or operations that may be implemented by the computer processor 104/119 or other components in the client device 102A and/or master device 120.

According to certain embodiments, the memory 106/122 may also store a communications module 110/132. The communication module 110/132 may be configured to facilitate communication with other devices (e.g., between client devices 102A/102B and master devices 120). To this end, the communication module 110/132 may be configured to operate using various network protocols and layers, such as a Transmission Control Protocol (TCP)/Internet Protocol (IP), Ethernet, media access control layers, and/or the like. The communications module 110/132 may also be interacting with the network and I/O interfaces 114/134 to facilitate communication using various networking standards and interfaces, as described below.

The network and I/O interfaces 114/134 may comprise one or more communication interfaces or network interface devices to provide for the transfer of data between the client device 102A and another device (e.g., network server) via a network (not shown). The communication interfaces may include, but are not limited to: body area networks (BANs), personal area networks (PANs), wired local area networks (LANs), wireless local area networks (WLANs), wireless wide area networks (WWANs), and so forth. The client device 102A may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2012, published Mar. 29, 2012;), the Bluetooth standard, the Bluetooth Low-Energy standard, the Wi-Gig standard, and/or any other wireless standard and/or a combination thereof. The wireless system may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the client device 102A and another device such as an access point, a host computer, a server, a router, a reader device, and the like. The network 118 may include, but is not limited to: the Internet, a private network, a virtual private network, a wireless wide area network, a local area network, a metropolitan area network, a telephone network, and so forth.

The display 116/138 may include, but is not limited to, a liquid crystal display, a light-emitting diode display, or an E-Ink™ display as made by E Ink Corp. of Cambridge, Mass. The display may be used to show content to a user in the form of text, images, or video. In certain instances, the display may also operate as a touch screen display that may enable the user to initiate commands or operations by touching the screen using certain finger or hand gestures.

According to one or more embodiments, the client device 102A may be a short-range communication client device, and the master device 120 may be a short-range communication master device. For instance, both the client device 102A and the master device 102A may be dedicated short-range communication (DSRC) devices capable of communication in one or more DSRC channels. Furthermore, the client device 102A and the master device 120 may be configured to communicate in DSRC channel frequencies of approximately 5.85 GHz to 5.925 GHz. It will be appreciated other channel frequencies are also contemplated. As previously discussed DSRC channels may typically be used by vehicle communication systems (e.g., emergency warning systems, collision avoidance systems, roadside assistance systems, and/or other safety related or communication related systems). Such vehicle communications systems may be configured to assume operating conditions free of interference from other devices (e.g., the client device 102A and the master device 120). Thus, the systems and methods described herein may facilitate communication between the client device 102A and the master device 120 in a short-range communication channel (e.g., a DSRC channel) without interfering with the vehicle communications systems that also operate in short-range communication channels. To this end, communication between the client device 102A and the master device 120 in a short-range communication channel may be established only when both devices are located outside of a vehicle.

For example, according to certain embodiments, the master device 120 may receive an indication that it is a short-range communication master device (e.g., a DSRC master device). For instance, the master device 120 may have been pre-configured to be a short-range communication master device, such as during assembly, manufacture, by a device configurator, and/or at any other time or by any other means.

As another example, the master device 120 may be dynamically configured as a short-range communication master device, such as by an access point, base station, and/or the like.

In some implementations, the master device 120 may determine whether it (e.g., the master device 120) is located outside of a vehicle. If the master device 120 is located outside of a vehicle, the master device 120 may enable communication using short-range communication channels. The master device 120 may identify a short-range communication client device (e.g., client device 102), such as via the communications module 132. To this end, the communications module 132 may transmit, to the short-range communication client device, a request for a connection in a short-range communication channel (e.g., a DSRC channel). The request may include an indication that communication using short-range communication channels is enabled. Furthermore, in certain implementations, the master may indicate peer-to-peer connection is enabled (e.g., a Wi-Fi Direct connection) in the short-range communication channel, such as between two short-range communication client devices (e.g., client device 102A and client device 102B).

In other implementations, the master device 120 may determine that it is located in a mobile environment (e.g., as opposed to being located outside of a vehicle). To this end, the master device 120 (e.g., via the communications module 132) may be configured to disable communication over short-range communication channels when located in a mobile environment. In this manner, the master device 120 may prevent connections with client device(s) 102 using short-range communication channels while inside of a vehicle. For example, in certain embodiments, the communications module 132 may transmit signals (e.g., to the client device(s) 102) indicating that communication using short-range communication channels is disabled. In other embodiments, the client device(s) 102 may be restricted from communication using a short-range communication channel unless initiated by the master device 120. Thus, if the master device 120 is located within a mobile environment, the master device 120 may avoid using short-range communication channels to communicate with other devices (e.g., including client device(s) 102). Since the interior of a vehicle may be considered a mobile environment, the master device 102A may ensure the avoidance of communication with the client device 102A using short-range communication channels.

Additionally, various implementations are possible with respect to determining whether the master device 120 is located outside of a vehicle. In some implementations, such a determination may be based on determining whether the master device 120 is located in a stationary environment or a mobile environment. For instance, the power module 128 may determine whether the master device 120 is operating using alternating current (A/C) power. It will be appreciated that A/C power is generally provided at stationary locations, such as buildings, residences, and/or the like. Furthermore, it will be appreciated that vehicles, which may be considered mobile environments, do not typically provide A/C power, and may typically provide direct current (DC) power instead (e.g., via a cigarette lighter port and/or a universal serial bus (USB) port). Thus, a determination that the master device 120 is operating under A/C power may indicate that the master device 120 is located in a stationary environment, which may indicate that the master device 120 is located outside of the vehicle (e.g., and/or outside of any other vehicle).

On the other hand, if the power module 128 determines that the master device 120 is operating using a power source other than A/C power, there is the possibility that the master device 120 may be located within a vehicle. Thus, the master device 120 may be configured to disable communication using short-range communication channels. For instance, in certain implementations, the power module 128 may determine that the master device 120 is operating using battery power. The use of battery power may indicate that the master device 120 is operating in a mobile environment. This indication may preclude the power module 128 from determining that the master device is located outside of a vehicle. As a result, communication between the master device 120 and the client device(s) 102 using short-range communication channels may be disabled.

According to other embodiments, the master device 120 may determine whether it is located outside of a vehicle (e.g., in a stationary environment) via the operations of the location determination module 130. For example, the location determination module 130 may be configured to determine, based at least in part on location information, whether the master device 120 is moving and/or whether the master device 120 is stationary. Location information may include various types of information, such as satellite information (e.g., GPS information), Wi-Fi information, and/or the like. In some implementations, the location determination module 130 may determine whether the master device 120 has moved more than a predetermined distance over a predetermined amount of time. If so, the location determination module 130 may determine that the master device 120 is located in a mobile environment. If not, the location determination module 130 may determine that the master device 120 is located in a stationary environment and thus, outside of a vehicle.

According to one or more embodiments, the communications module 132 may only enable communication over short-range communication channels upon receiving, from both the power module 128 and the location determination module 130, positive determinations that the master device 120 is located outside of a vehicle (e.g., and/or the master device 120 is stationary). Otherwise, the communications module 132 may disable establishing connections in short-range communication channels. In other implementations, the communications module 132 may enable use of short-range communication channels upon receiving, from either the power module 128 or the location determination module 130, a positive determination that the master device 120 is located outside of a vehicle. In such implementations, the communications module 132 may only disable use of short-range communication channels upon receiving, from both the power module 128 and the location determination module 130, determinations that the master device 120 is located within a mobile environment.

Figure 2A:
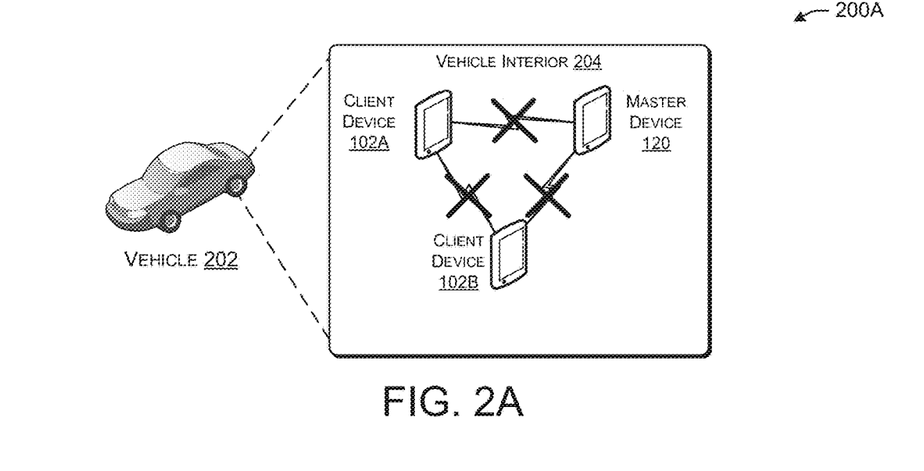
FIG. 2A shows a block diagram for managing short-range communication, according to one or more example embodiments.

Referring now to FIG. 2A, a block diagram 200A is depicted for managing short-range communication in accordance with one or more example embodiments. As shown in the diagram 200A, the client device 102A and the master device 120 may be located within a vehicle interior 204 of a vehicle 202. As such, the master device 120 may determine that it is located inside the vehicle (e.g., and/or located within a mobile environment). As a result, the master device 120 may disable communication using short-range communication channels (e.g., a DSRC channels) for the client device 102A. In some implementations, the master device 120 may in particular disable a peer-to-peer connection with the client device 102A using short-range communication channels. Furthermore, the master device 120 may also disable peer-to-peer connections in the short-range communication channels between the client device 102 and other client devices, such as client device 102B. For example, absent receiving, from the master device 120, a signal indicating that peer-to-peer connections in short-range communication channels are enabled, neither client device 102A nor client device 102B may be able to initiate and/or otherwise establish a peer-to-peer connection using short-range communication channels.

It will be appreciated, however, that peer-to-peer connection may still be established among the master device 120, client device 102A, and client device 102B using other channels (e.g., non short-range communication channels). As a result, communication among these devices may occur in the vehicle interior 204 without causing interference to vehicle communication systems (e.g., associated with the vehicle 202 and/or other vehicles) operating in the short-range communication channels.

Figure 2B:
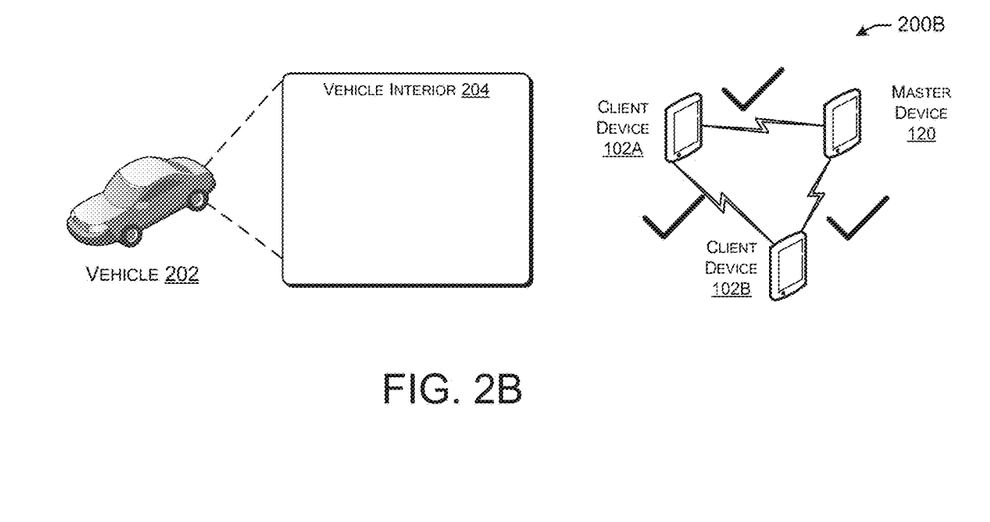
FIG. 2B shows another block diagram for managing short-range communication, according to one or more example embodiments.

Referring now to FIG. 2B, another block diagram 200B is depicted for managing short-range communication in accordance with one or more example embodiments. As shown in FIG. 2B, the client device 102A, the client device 102B, and the master device 120 may be located outside of the vehicle interior 204 of the vehicle. As a result, the master device 120 may determine, based on the functionality of the power module 128 and/or the location determination module 130, that it is located outside of the vehicle 202. As such, there may be relatively less danger of interfering with vehicle systems communicating in short-range communication channels. Thus, the master device 120 may be configured to enable peer-to-peer communication in short-range communication channels. For instance, the master device 120 may configured to transmit one or more signals indicating that peer-to-peer communication in short-range communication channels is enabled. Such signals may be received by the client device 102A and the client device 102B, which may proceed with establishing peer-to-peer connection with each other, with the master device 120, and/or any other devices.

Figure 3:
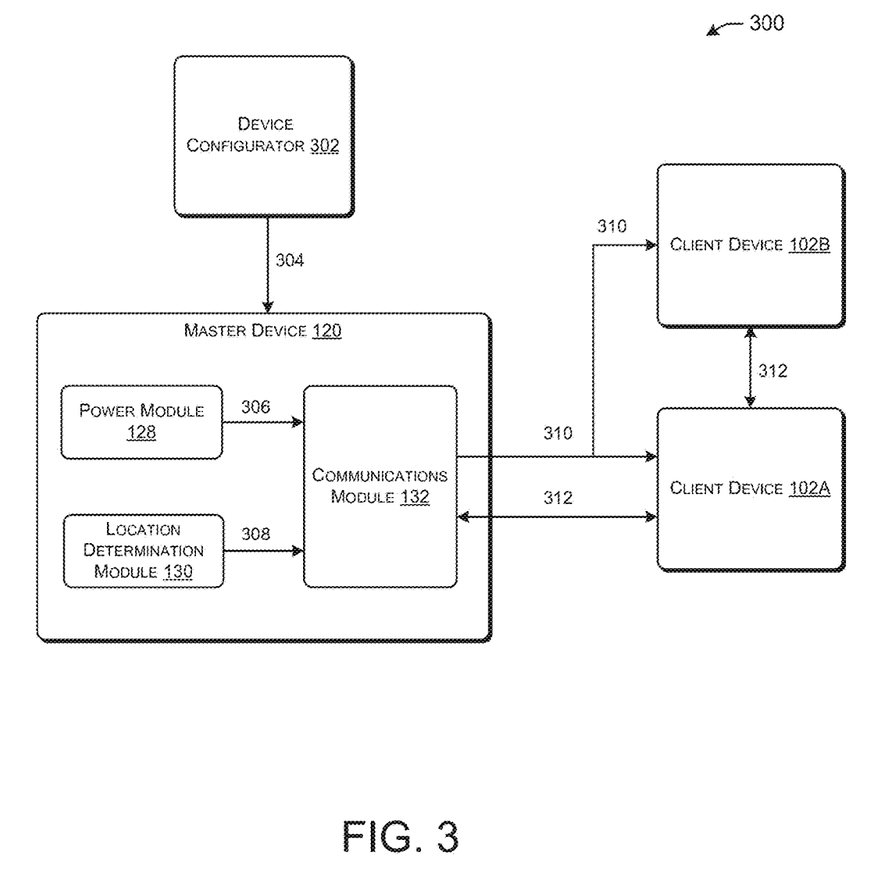
FIG. 3 show a data flow diagram for managing short-range communication, according to one or more example embodiments.

Referring now to FIG. 3, a diagram of a data flow 300 is illustrated for managing short-range communication in accordance with one or more example embodiments. As depicted by the data flow 300, a device configurator may be provide an indication 304 to the master device 120 that the master device 120 is designated as a short-range communication master device (e.g., a DSRC master device). After receiving the designation, the master device 120 may configured to determine whether it is located outside of a vehicle. As previously discussed, as part of this determination, the master device 120 may be configured to determine whether it is located within a stationary environment or whether it is located in a mobile environment.

For instance, the power module 128 may be configured to determine whether the master device 120 is operating using A/C power. If so, the power module 128 may determine that the master device 120 is operating in a stationary environment and that the master device 120 is thus located outside of a vehicle. If the power module 128 determines that the master device 120 is not operating on A/C power (e.g., operating on battery power), then the power module 128 may determine that the master device 120 is located within a mobile environment. Either determination may be transmitted 306 to the communications module 132.

In addition, the location determination module 130 may also be configured to determine whether the master device 120 is located within a stationary environment or a mobile environment. Such a determination may be based on location information (e.g., satellite information, Wi-Fi information, etc.). The determination may be further based on the location information in relation to a predetermined amount of time. For example, if the location determination module 130 determines that the master device 120 has moved more than a predetermined distance within a predetermined amount of time, the location determination module 130 may determine that the mobile device 120 is located within a mobile environment. Conversely, if the location determination module 130 determines the master device 120 has not moved more than a predetermined distance within a predetermined amount of time, the location determination module 130 may determine that the mobile device 120 is located within a stationary environment. Either determination may be transmitted 308 to the communications module 132.

Upon receiving the determinations from the power module 128 and/or the location determination module 130, the communications module 132 may make the ultimate determination of whether the master device 120 is located outside of the vehicle (e.g., whether the master device 120 is located outside of a vehicle). For instance, in some implementations, if both the power module 128 and the location determination module 130 determine that the master device 120 is located in a stationary environment, then the communications module 132 may determine that the master device 120 is located outside of a vehicle. Otherwise, the communications module 132 may determine that the master device 120 is located in a mobile environment, and as a result, disable communication with and/or among the client device 102A and client device 102B using short-range communication channels.

In other implementations, if either the power module 128 or the location determination module 130 determine that the master device 120 is located in a stationary environment, then the communications module 132 may determine that the master device 120 is located outside of a vehicle. If both the power module 128 and the location determination module 130 determine that the master device 120 is located in a mobile environment, then the communications module 132 may disable communication with using short-range communication channels and/or among the client device 102A and client device 102B.

According to one or more embodiments, if the communications module 132 determines that the master device 120 is located outside of a vehicle and/or vehicle environment (e.g., within a stationary environment), the communications module 132 may transmit 310 a signal, to the client device 102A, client device 102B, and/or any other client devices within range. The signal may indicate that communication in a short-range communication channel (e.g., a DSRC channel) is enabled. In particular, the signal may in certain embodiments indicate that peer-to-peer communication use the short-range communication channel is enabled. Thus, peer-to-peer connections 312 using the short-range communication channel may be established among the client device 102A, client device 102B, and/or the master device 120. Furthermore, since the location of these devices may be determined (by the master device 120) as being outside of the vehicle and/or vehicle environment, such peer-to-peer connections may be established without interfering with any vehicle communication channels operating in short-range communication channels.

Figure 4:
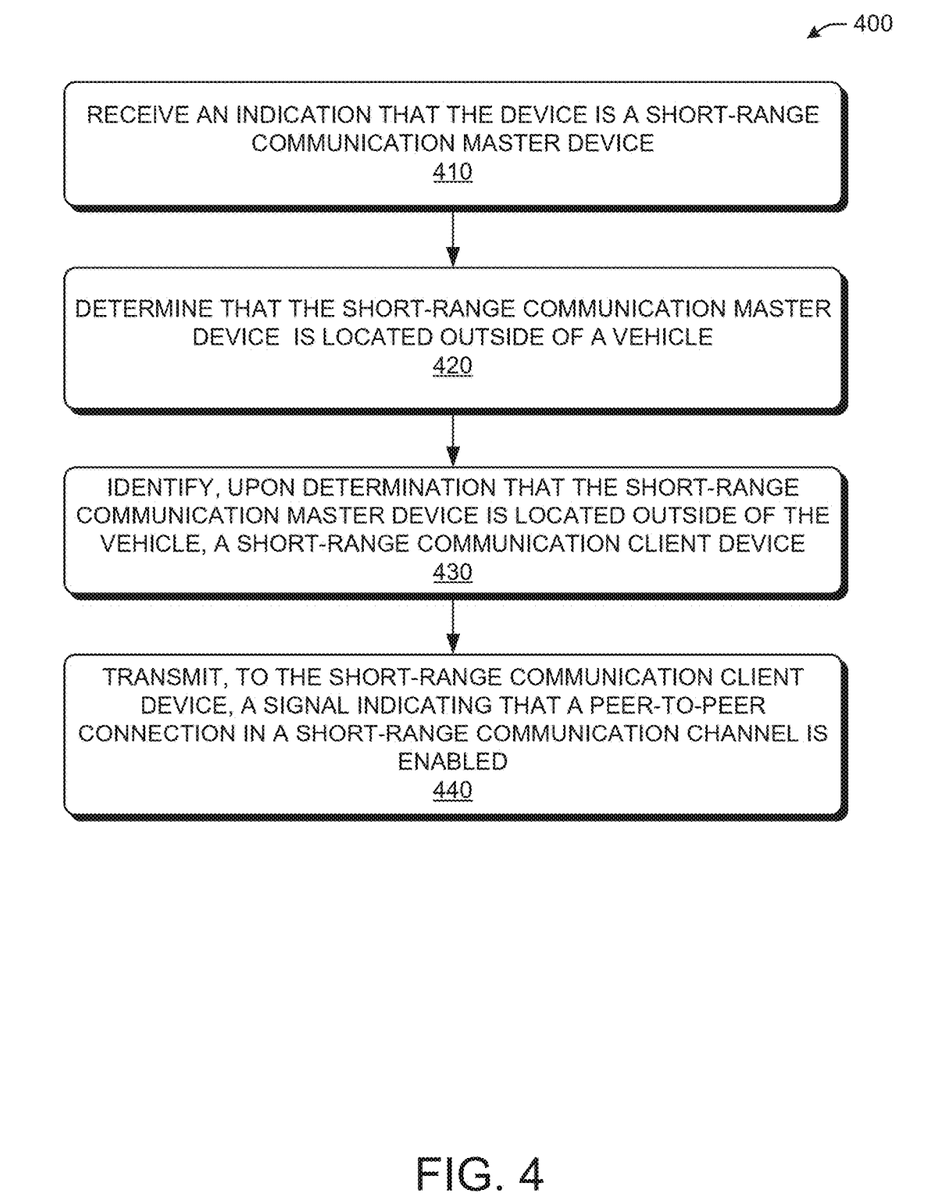
FIG. 4 shows a flow diagram for managing short-range communication, according to one or more example embodiments.

Referring now to FIG. 4, a flow diagram of a method 400 is illustrated depicting managing communication on a dedicated short-range communication channel in accordance with one or more example embodiments. The method 400 may begin in block 410, where a computer, such as a master device 120, may receive an indication that the device is a short-range communication master device. In block 420, the master device 120 may determine that the short-range communication master device is located outside of a vehicle. In block 430, the master device 120 may identify, based on determining that the short-range communication master device is located outside of the vehicle, a short-range communication client device. In block 440, the master device 120 may signal that, by the radio transceiver to the short-range communication client device, a peer-to-peer connection in a short-range communication channel is enabled.

Figure 5:
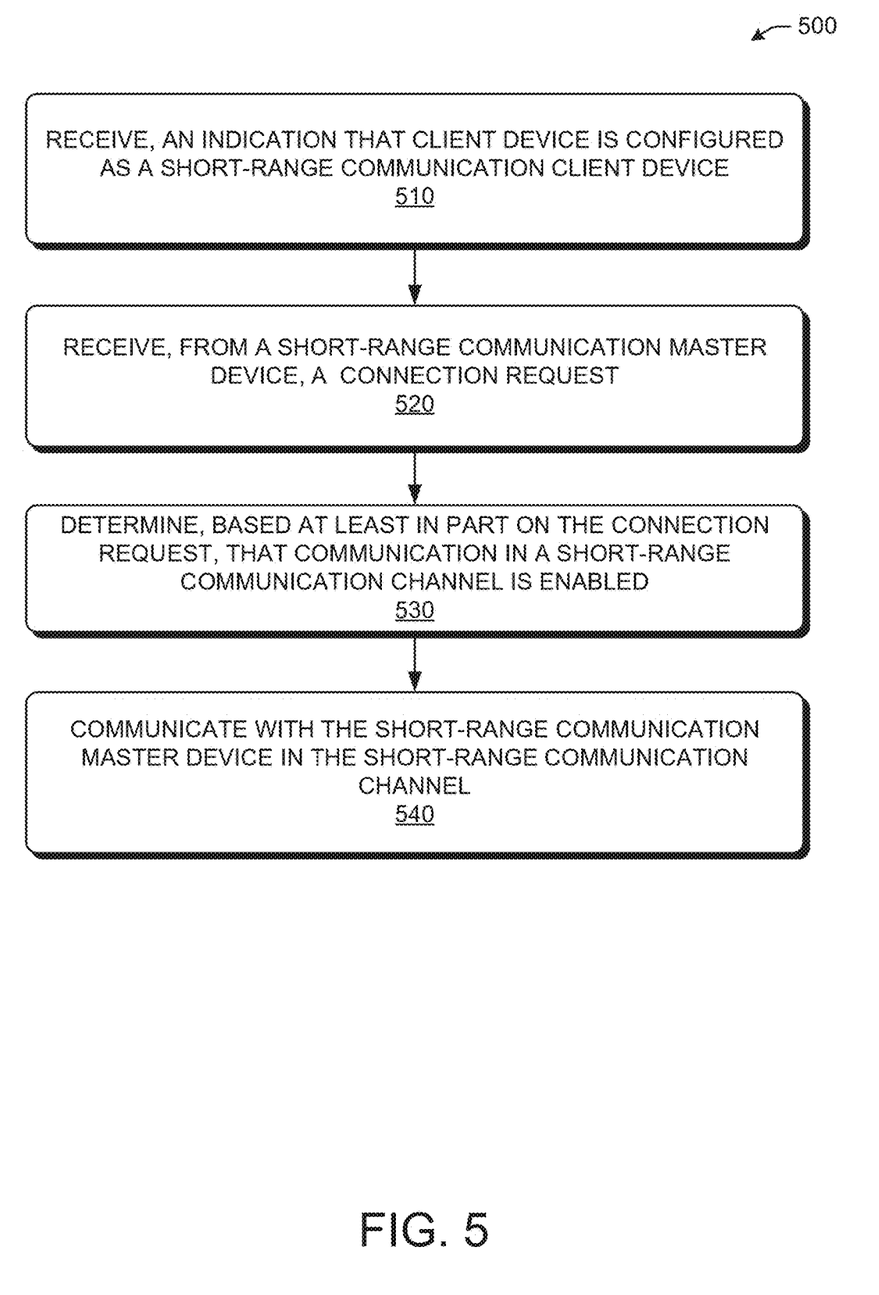
FIG. 5 shows another flow diagram for managing short-range communication, according to one or more example embodiments

Referring now to FIG. 5, a flow diagram of a method 500 is illustrated for managing short-range communication in accordance with one or more example embodiments. The method 500 may begin in block 510, where a computer, such as a client device 102A and/or client device 102B, may receive an indication that it is configured as a short-range communication client device. In block 520, the client device 102A and/or client device 102B may receive, from a short-range communication master device (e.g., master device 120), a signal. In block 530, the client device 102A and/or client device 102B may determine, based at least in part on the signal, that communication in a short-range communication channel is enabled. In block 540, the client device 102A and/or client device 102B may communicate with each other and/or with the short-range communication master device (e.g., master device 120) in the short-range communication channel. In certain implementations, based on the received signal from the master device 120, one or more peer-to-peer connections may be established among the client device 102A, client device 102B, and/or the master device 120.

In addition, according to one or more embodiments, other client devices within range of the master device 120 may also receive the signal, from the master device 120, indicating that communications using the short-range communication channel is enabled. As a result, the other client devices may be able to establish peer-to-peer connections in the short-range communication channel with the client device 102A, client device 102B, and/or the master device 120. Thus, it should be understood that any client device 102 that receives such an indication from the master device 120 may be able to establish connections (e.g., peer-to-peer connections) in the short-range communication channel.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1 is a device for wireless communication, comprising: a radio transceiver; at least one processor; and at least one memory storing computer-executable instructions, that when executed by the at least one processor, causes that at least one processor to: receive an indication that the device is a short-range communication master device; determine that the short-range communication master device is located outside of a vehicle; identify, based on determining that the short-range communication master device is located outside of the vehicle, one or more short-range communication client devices; and transmit a signal, by the radio transceiver to the one or more short-range communication client devices, indicating that peer-to-peer communication in a short-range communication channel is enabled.

In Example 2, the subject matter of Example 1 can optionally include that the computer-executable instructions to determine that the short-range communication master device is located outside of the vehicle further comprises instructions to: determine that the short-range communication master device is operating on alternating current (A/C) power.

In Example 3, the subject matter of Example 1 can optionally include that the computer-executable instructions to determine that the short-range communication master device is located outside of the vehicle further comprises instructions to: determine, based at least in part on location information, that the short-range communication master device is located in a stationary environment.

In Example 4, the subject matter of Example 1 can optionally include that the at least one memory further comprises computer-executable instructions to: determine that the short-range communication master device is located within a mobile environment; and disable, based on determining that the short-range communication master device located within a mobile environment, peer-to-peer communication in the short-range communication channel.

In Example 5, the subject matter of Example 1 can optionally include that the computer-executable instructions to determine that the short-range communication master device is located within a mobile environment further comprises instructions to: determine that the short-range communication master device is operating on battery power.

In Example 6, the subject matter of Example 4 can optionally include that the computer-executable instructions to determine that the short-range communication master device is located within a mobile environment further comprises instructions to: determine, based at least in part on location information, that the short-range communication master device is moving.

In Example 7, the subject matter of Example 1 can optionally include that the signal comprises a connection request for communication with the one or more short-range communication client devices in the short-range communication channel.

In example 8, the subject matter of Example 1 can optionally include that the short-range communication channel is a dedicated short-range communication (DSRC) channel Example 9 is a method for wireless communication, comprising: receiving, by a device comprising one or more processors and a radio transceiver, an indication that the device is a short-range communication master device; determining that the short-range communication master device is located outside of a vehicle; identifying, based on determining that the short-range communication master device is located outside of the vehicle, one or more short-range communication client devices; and transmitting, by the radio transceiver to the one or more short-range communication client devices, a signal indicating that peer-to-peer communication in a short-range communication channel is enabled.

In Example 10, the subject matter of Example 9 can optionally include that determining that the short-range communication master device is outside the vehicle further comprises: determining that the short-range communication master device is operating on alternating current (A/C) power.

In Example 11, the subject matter of Example 9 can optionally include that determining that the short-range communication master device is outside the vehicle further comprises: determining, based at least in part on location information, that the short-range communication master device is located within a stationary environment.

In Example 12, the subject matter of Example 9 can optionally include determining that the short-range communication master device is located within a mobile environment; disabling, based on determining that the short-range communication master device located within a mobile environment, peer-to-peer communication in the short-range communication channel.

In Example 13, the subject matter of Example 12 can optionally include that determining that the short-range communication master device is located within a mobile environment further comprises: determining that the short-range communication master device is operating on battery power.

In Example 14, the subject matter of Example 12 can optionally include that determining that the short-range communication master device is located within a mobile environment further comprises: determining, based at least in part on location information, that the short-range communication master device is moving.

In Example 15, the subject matter of Example 9 can optionally include that the signal comprises a connection request for communication with the one or more short-range communication client devices in the short-range communication channel.

In Example 16, the subject matter of Example 9 can optionally include that the short-range communication channel is a dedicated short-range communication (DSRC) channel.

Example 17 is a non-transitory computer-readable medium comprising instructions, that when executed by at least one processor, cause the at least one processor to: receive an indication that a device is a short-range communication master device; determine that the short-range communication master device is located outside of a vehicle; identify, based on determining that the short-range communication master device is located outside of the vehicle, one or more short-range communication client devices; and transmit, to the short-range communication client device, a signal indicating that peer-to-peer communication in a short-range communication channels is enabled.

In Example 18, the subject matter of Example 17 can optionally include that the computer-executable instructions to determine that the short-range communication master device is located outside of the vehicle further comprises instructions to: determine that the short-range communication master device is operating on alternating current (A/C) power.

In Example 19, the subject matter of Example 17 can optionally include that the computer-executable instructions to determine that the short-range communication master device is located outside of the vehicle further comprises instructions to: determine, based at least in part on location information, that the short-range communication master device is located within a stationary environment.

In Example 20, the subject matter of Example 17 can optionally include computer-executable instructions to: determine that the short-range communication master device is located within a mobile environment; and disable, based on determining that the short-range communication master device is located within a mobile environment, peer-to-peer communication in the short-range communication channel.

In Example 21, the subject matter of Example 20 can optionally include that the computer-executable instructions to determine that the short-range communication master device is located within a mobile environment further comprises instructions to: determine that the short-range communication master device is operating on battery power.

In Example 22, the subject matter of Example 20 can optionally include that the computer-executable instructions to determine that the short-range communication master device is located within a mobile environment further comprises instructions to: determine, based at least in part on location information, that the short-range communication master device is moving.

In Example 23, the subject matter of Example 17 can optionally include that the signal comprises a connection request for communication with the one or more short-range communication client devices in the short-range communication channel is enabled.

In Example 24, the subject matter of Example 17 can optionally include that the short-range communication channel is a dedicated short-range communication (DSRC) channel.

Example 25 is a client device, comprising: a radio transceiver; at least one processor; and at least one memory storing computer-executable instructions, that when executed by the at least one processor, causes that at least one processor to: receive, an indication that client device is configured as a short-range communication client device; receive, from a short-range communication master device, a signal; determine, based at least in part on the signal, that communication in a short-range communication channel is enabled; and establish a connection with the short-range communication master device in the short-range communication channel.

In Example 26, the subject matter of Example 25 can optionally include that the computer-executable instructions further cause the at least one processor to: establish a second connection with a second client device in the short-range communication channel.

In Example 27, the subject matter of Example 26 can optionally include that the second client device has received, from the short-range communication master device, an indication that communication in the short-range communication channel is enabled.

Example 28 is an apparatus, comprising: means for receiving, by a device comprising one or more processors and a radio transceiver, an indication that the device is a short-range communication master device; means for determining that the short-range communication master device is located outside of a vehicle; means for identifying, based on determining that the short-range communication master device is located outside of the vehicle, one or more short-range communication client devices; and means for transmitting, by the radio transceiver to the one or more short-range communication client devices, a signal indicating that peer-to-peer communication in a short-range communication channel is enabled.

In Example 29, the subject matter of Example 28 can optionally include that the means for determining that the short-range communication master device is outside the vehicle further comprises: means for determining that the short-range communication master device is operating on alternating current (A/C) power.

In Example 30, the subject matter of Example 28 can optionally include that the means for determining that the short-range communication master device is outside the vehicle further comprises: means for determining, based at least in part on location information, that the short-range communication master device is located within a stationary environment.

In Example 31, the subject matter of Example 28 can optionally include that the means for determining that the short-range communication master device is located within a mobile environment; and means for disabling, based on determining that the short-range communication master device located within a mobile environment, peer-to-peer communication in the short-range communication channel In Example 32, the subject matter of Example 31 can optionally include that the means for determining that the short-range communication master device is located within a mobile environment further comprises: means for determining that the short-range communication master device is operating on battery power In Example 33, the subject matter of Example 31 can optionally include that the means for determining that the short-range communication master device is located within a mobile environment further comprises: means for determining, based at least in part on location information, that the short-range communication master device is moving In Example 34, the subject matter of Example 28 can optionally include that the signal comprises a connection request for communication with the one or more short-range communication client devices in the short-range communication channel In Example 35, the subject matter of Example 28 can optionally include that the short-range communication channel is a dedicated short-range communication (DSRC) channel.

What is claimed is:

1. A device for wireless communication, comprising:
a radio transceiver;
at least one processor; and
at least one memory storing computer-executable instructions that, when executed by the at least one processor, cause the at least one processor to:
determine that the device is pre-configured as a short-range communication master device;
determine that the short-range communication master device is located outside of a vehicle;
identify one or more short-range communication client devices;
determine non-interference with one or more vehicle communication systems operating in short-range communication channels of the vehicle, based at least in part on the short-range communication master device being located outside of the vehicle;
determine to enable short-range communications, between two or more short-range communication client devices, of the one or more short-range communication client devices, based at least in part on the non-interference, wherein the short-range communications between the two or more short-range communication client devices occurs over a peer-to-peer connection; and
cause to send, to the one or more short-range communication client devices, a first signal indicating that short-range communications are enabled.

2. The device of claim 1, wherein the computer-executable instructions to determine that the short-range communication master device is located outside of the vehicle further comprises instructions to:
determine that the short-range communication master device is operating on alternating current (A/C) power.

3. The device of claim 1, wherein the computer-executable instructions to determine that the short-range communication master device is located outside of the vehicle further comprises instructions to:
determine, based at least in part on location information, that the short-range communication master device is located in a stationary environment.

4. The device of claim 1, further comprising computer-executable
instructions to:
determine that the short-range communication master device is located within a mobile environment;
determine interference with the one or more vehicle communication systems operating in short-range communication channels of the vehicle, based at least in part on the short-range communication master device being located within the mobile environment;
determine to disable short-range communications based at least in part on the interference; and
cause to send, to the one or more short-range communication client devices, a second signal indicating that short-range communications are disabled.

5. The device of claim 4, wherein the computer-executable instructions to determine that the short-range communication master device is located within the mobile environment further comprises instructions to:
determine that the short-range communication master device is operating on battery power.

6. The device of claim 4, wherein the computer-executable instructions to determine that the short-range communication master device is located within the mobile environment further comprises instructions to:
determine that the short-range communication master device is moving, based at least in part on location information.

7. The device of claim 1, wherein the short-range communications comprise communication using a dedicated short-range communication (DSRC) channel.

8. A method for wireless communication, comprising:
determining, by a device comprising at least one processor and a radio transceiver, that the device is pre-configured as a short-range communication master device;
determining that the short-range communication master device is located outside of a vehicle;
identifying one or more short-range communication client devices;
determining, non-interference with one or more vehicle communication systems operating in short-range communication channels of the vehicle, based at least in part on the short-range communication master device being located outside of the vehicle;
determining to enable short-range communications, between two or more short-range communication client devices, of the one or more short-range communication client devices, based at least in part on the non-interference, wherein the short-range communications between the two or more short-range communication client devices occurs over a peer-to-peer connection; and
causing to send, to the one or more short-range communication client devices, a first signal indicating that short-range communications are enabled.

9. The method of claim 8, wherein determining that the short-range communication master device is outside the vehicle further comprises:

determining that the short-range communication master device is operating on alternating current (A/C) power.

10. The method of claim 8, wherein determining that the short-range communication master device is outside the vehicle further comprises:
   determining that the short-range communication master device is located within a stationary environment, based at least in part on location information.

11. The method of claim 8, further comprising:
   determining that the short-range communication master device is located within a mobile environment;
   determining interference with the one or more vehicle communication systems operating in short-range communication channels of the vehicle, based at least in part on the short-range communication master device being located within the mobile environment;
   determining to disable short-range communications based at least in part on the interference; and
   causing to send, to the one or more short-range communication client devices, a second signal indicating that short-range communications are disabled.

12. The method of claim 11, wherein determining that the short-range communication master device is located within the mobile environment further comprises:
   determining that the short-range communication master device is operating on battery power.

13. The method of claim 11, wherein determining that the short-range communication master device is located within the mobile environment further comprises:
   determining, based at least in part on location information, that the short-range communication master device is moving.

14. The method of claim 8, wherein the short-range communications comprise communication using a dedicated short-range communication (DSRC) channel.

15. A non-transitory computer-readable medium comprising instructions that, when executed by at least one processor, cause the at least one processor to:
   determine that a device is pre-configured as a short-range communication master device;
   determine that the short-range communication master device is located outside of a vehicle;
   identify one or more short-range communication client devices;
   determine, non-interference with one or more vehicle communication systems operating in short-range communication channels of the vehicle, based at least in part on the short-range communication master device being located outside of the vehicle;
   determine to enable short-range communications, between two or more short-range communication client devices, of the one or more short-range communication client devices, based at least in part on the non-interference, wherein the short-range communications between the two or more short-range communication client devices occurs over a peer-to-peer connection; and
   cause to send, to the one or more short-range communication client devices, a first signal indicating that short-range communications are disabled.

16. The computer-readable medium of claim 15, wherein the instructions to determine that the short-range communication master device is located outside of the vehicle further comprises instructions to:
   determine that the short-range communication master device is operating on alternating current (A/C) power.

17. The computer-readable medium of claim 15, wherein the instructions to determine that the short-range communication master device is located outside of the vehicle further comprises instructions to:
   determine that the short-range communication master device is located within a stationary environment, based at least in part on location information.

18. The computer-readable medium of claim 15, further comprising computer-executable instructions to:
   determine that the short-range communication master device is located within a mobile environment;
   determine interference with the one or more vehicle communication systems operating in short-range communication channels of the vehicle, based at least in part on the short-range communication master device being located outside of the vehicle;
   determine to disable short-range communications based at least in part on the interference; and
   cause to send, to the one or more short-range communication client devices, a second signal indicating that short-range communications are disabled.

19. The computer-readable medium of claim 18, wherein the computer-executable instructions to determine that the short-range communication master device is located within the mobile environment further comprises instructions to:
   determine that the short-range communication master device is operating on battery power.

20. The computer-readable medium of claim 18, wherein the computer-executable instructions to determine that the short-range communication master device is located within the mobile environment further comprises instructions to:
   determine that the short-range communication master device is moving, based at least in part on location information.

21. The computer-readable medium of claim 15, wherein the short-range communications comprise communication using a dedicated short-range communication (DSRC) channel.

22. A client device, comprising:
   a radio transceiver;
   at least one processor; and
   at least one memory storing computer-executable instructions that, when executed by the at least one processor, cause the at least one processor to:
      determine that the client device is configured as a short-range communication client device;
      identify, from a pre-configured short-range communication master device, a signal indicating that short-range communications are enabled;
   determine non-interference with one or more vehicle communication systems operating in short-range communication channels of the vehicle, based at least in part on the signal;
      cause to establish a first connection with the pre-configured short-range communication master device using a short-range communication channel in the short-range communication channels of the vehicle; and
   cause to establish a second connection with a second client device using the short-range communication channel, wherein the second connection is a peer-to-peer connection.

23. The client device of claim 22, wherein the second client device has identified, from the pre-configured short-range communication master device, the signal indicating that short-range communications are enabled.

* * * * *